United States Patent
Ward et al.

(10) Patent No.: US 10,793,069 B2
(45) Date of Patent: Oct. 6, 2020

(54) METHOD FOR ASSISTING THE DRIVER OF A MOTOR VEHICLE IN MANEUVERING THE MOTOR VEHICLE WITH A TRAILER, DRIVER ASSISTANCE SYSTEM AS WELL AS VEHICLE/TRAILER COMBINATION

(71) Applicant: Connaught Electronics Ltd., Tuam, County Galway (IE)

(72) Inventors: Enda Ward, Tuam (IE); Mike Togher, Tuam (IE); Fergal O'malley, Tuam (IE)

(73) Assignee: Connaught Electronics Ltd., Tuam, County Galway (IE)

( * ) Notice: Subject to any disclaimer, the term of this patent is extended or adjusted under 35 U.S.C. 154(b) by 0 days.

(21) Appl. No.: 16/324,295

(22) PCT Filed: Jul. 27, 2017

(86) PCT No.: PCT/EP2017/069023
§ 371 (c)(1),
(2) Date: Feb. 8, 2019

(87) PCT Pub. No.: WO2018/029005
PCT Pub. Date: Feb. 15, 2018

(65) Prior Publication Data
US 2019/0176698 A1 Jun. 13, 2019

(30) Foreign Application Priority Data
Aug. 9, 2016 (DE) .................. 10 2016 114 689

(51) Int. Cl.
*B60R 1/00* (2006.01)
*H04N 5/247* (2006.01)
(Continued)

(52) U.S. Cl.
CPC ............... *B60R 1/00* (2013.01); *B62D 13/06* (2013.01); *B62D 15/0275* (2013.01);
(Continued)

(58) Field of Classification Search
CPC ... B60R 1/00; B60R 2300/30; B60R 2300/60; B60R 2300/808; B60Y 2200/147;
(Continued)

(56) References Cited

U.S. PATENT DOCUMENTS

2014/0085472 A1* 3/2014 Lu ........................... B60R 1/002
348/148
2014/0160276 A1* 6/2014 Pliefke ...................... B60R 1/00
348/118
(Continued)

FOREIGN PATENT DOCUMENTS

DE 102013214368 A1 1/2015
DE 102015016727 A1 6/2016
(Continued)

OTHER PUBLICATIONS

International Search Report and Written Opinion Issued in Corresponding PCT Application No. PCT/EP2017/069023 in English, dated Sep. 21, 2017 (8 Pages).
(Continued)

*Primary Examiner* — Sath V Perungavoor
*Assistant Examiner* — Tyler B Edwards
(74) *Attorney, Agent, or Firm* — Osha Liang LLP (57) ABSTRACT

The invention relates to a method for assisting a driver of a motor vehicle (1) in maneuvering the motor vehicle (1) with a trailer (3), wherein image data is captured from an environmental region (12) of the motor vehicle (1) by means of at least one vehicle-side camera (5) and by means of at least one trailer-side camera (10) and an image (B) of the environmental region (12) is created for displaying on a vehicle-
(Continued)

side display device (14) depending on the captured image data, wherein a perspective (P1, P2), from which the environmental region (12) is displayed in the image (B), is determined depending on a pivot angle (17) between the trailer (3) and the motor vehicle (1). The invention additionally relates to a driver assistance system (2) as well as to a vehicle/trailer combination with a motor vehicle (1), a trailer (3) and a driver assistance system (2).

13 Claims, 5 Drawing Sheets

(51) Int. Cl.
  *H04N 5/265* (2006.01)
  *B62D 13/06* (2006.01)
  *B62D 15/02* (2006.01)
(52) U.S. Cl.
  CPC ............ *H04N 5/247* (2013.01); *H04N 5/265* (2013.01); *B60R 2300/30* (2013.01); *B60R 2300/60* (2013.01); *B60R 2300/808* (2013.01); *B60Y 2200/147* (2013.01); *B60Y 2300/18033* (2013.01); *B60Y 2400/3015* (2013.01)
(58) Field of Classification Search
  CPC .. B60Y 2300/18033; B60Y 2400/3015; B62D 13/06; B62D 15/0275; H04N 5/247; H04N 5/265
  See application file for complete search history.

(56) References Cited

U.S. PATENT DOCUMENTS

| 2015/0217693 | A1* | 8/2015 | Pliefke | B62D 13/06 |
| | | | | 348/118 |
| 2016/0301863 | A1* | 10/2016 | Petrany | H04N 5/23238 |
| 2017/0280091 | A1* | 9/2017 | Greenwood | B60R 1/00 |

FOREIGN PATENT DOCUMENTS

| EP | 1892150 A2 | 2/2008 | | |
| GB | 2356612 A | * 5/2001 | ............... | B60R 1/00 |
| GB | 2356612 A | 5/2001 | | |

OTHER PUBLICATIONS

German Search Report Issued in Corresponding German Application No. 102016114689.7 in English, dated Apr. 11, 2017 (6 Pages).

\* cited by examiner

METHOD FOR ASSISTING THE DRIVER OF A MOTOR VEHICLE IN MANEUVERING THE MOTOR VEHICLE WITH A TRAILER, DRIVER ASSISTANCE SYSTEM AS WELL AS VEHICLE/TRAILER COMBINATION

The invention relates to a method for assisting a driver of a motor vehicle in maneuvering the motor vehicle with a trailer, wherein image data is captured from an environmental region of the motor vehicle by means of at least one vehicle-side camera and by means of at least one trailer-side camera, and an image of the environmental region is created depending on the captured image data for displaying on a vehicle-side display device. In addition, the invention relates to a driver assistance system as well as to a vehicle/trailer combination with a motor vehicle, with a trailer and with such a driver assistance system.

It is already known from the prior art to assist a driver of a motor vehicle in maneuvering, in particular in reversing, with a trailer coupled to the motor vehicle. Such a trailer can for example be a caravan or a horse trailer. Since an environmental region behind the trailer usually is not visible for the driver in looking into the interior mirror, images of the environmental region behind the trailer can be captured for example in the form of a video sequence by a trailer-side camera and displayed on a vehicle-side display device for assisting the driver. It is also known to implement a so-called "transparent trailer", in which images of the environmental region behind the motor vehicle and the trailer are displayed on the display device, but without the trailer itself. Thus, the driver gets the impression as if he could look through the trailer. Thus, the driver is able to perceive the environmental region behind the trailer. Thereto, the images are usually generated from image data of the trailer-side camera and a vehicle-side camera. However, therein, it can occur that the image generation or image synthesis is incorrect and thereby the images displayed on the display device are non-intuitive for the driver and/or do not show the actual environmental region behind the motor vehicle.

It is the object of the present invention to provide a solution, how a driver of a motor vehicle can be particularly reliably assisted in maneuvering the motor vehicle with a trailer.

According to the invention, this object is solved by a method, a driver assistance system as well as a vehicle/trailer combination having the features according to the respective independent claims. Advantageous embodiments of the invention are the subject matter of the dependent claims, of the description as well as of the figures.

In an embodiment of a method for assisting a driver of a motor vehicle in maneuvering the motor vehicle with a trailer, image data is captured from an environmental region of the motor vehicle by means of at least one vehicle-side camera and by means of at least one trailer-side camera. Depending on the captured image data, an image of the environmental region can be created for displaying on a vehicle-side display device. Moreover, a perspective, from which the environmental region is displayed in the image, is in particular determined depending on a pivot angle between the trailer and the motor vehicle.

In a method for assisting a driver of a motor vehicle in maneuvering the motor vehicle with a trailer, image data is preferably captured from an environmental region of the motor vehicle by means of at least one vehicle-side camera and by means of at least one trailer-side camera and an image of the environmental region is created depending on the captured image data for displaying on a vehicle-side display device. Moreover, a perspective, from which the environmental region is displayed in the image, is determined depending on a pivot angle between the trailer and the motor vehicle.

Thus, a driver assistance system can be realized by means of the method, which assists the driver in maneuvering a vehicle/trailer combination having the motor vehicle and the trailer. In particular, the driver is assisted in reversing with the vehicle/trailer combination during a turning maneuver. For example, the trailer can be a caravan or a horse trailer, which is coupled to a tow coupling of the motor vehicle. In particular, the trailer has a height, by which the environmental region behind the trailer is not or only poorly visible for the driver by looking into a rearview mirror. For assisting the driver in maneuvering with the vehicle/trailer combination, image data is captured from the environmental region by means of the at least one vehicle-side camera and the at least one trailer-side camera. Based on the image data, images of the environmental region are generated for example by an evaluation device in the form of a video processor and presented on the display device of the motor vehicle for example as a video. For example, the display device can be a screen in a dashboard of the motor vehicle, a head-up display device or a head-up display and/or a screen in a rearview mirror of the motor vehicle. For capturing the image data, the motor vehicle in particular has a rear camera or a reversing camera. The motor vehicle can for example also have an all-around view camera system with the rear camera, a front camera and two wing mirror cameras. For capturing the image data, the trailer in particular has a rear camera. The trailer can also have lateral cameras.

The trailer is pivotably supported at the tow coupling. This means that a pivot angle between the trailer and the motor vehicle can change for example during a turning maneuver. Therein, the pivot angle is that angle, by which a longitudinal axis of the trailer can pivot with respect to a longitudinal axis of the motor vehicle in a plane spanned by the vehicle longitudinal axis and a vehicle transverse axis. In straight traveling of the vehicle/trailer combination, the pivot angle between the longitudinal axis of the trailer and the longitudinal axis of the motor vehicle is about 0 degrees. This means that the longitudinal axis of the trailer is oriented along the longitudinal axis of the motor vehicle. In the pivoted state of the trailer, for example in a turning maneuver, the pivot angle is a value different from 0 degrees. This means that the longitudinal axis of the trailer is oriented obliquely to the longitudinal axis of the motor vehicle.

The image synthesis or the rendering, thus the generation of the image from the image data, can be adversely affected by the pivot angle. For example, the image synthesis for providing certain perspectives, from which the environmental region is displayed, cannot be correctly performed if the trailer is pivoted since capturing directions of the vehicle-side and the trailer-side camera can shift to each other in this case. In the pivoted state of the trailer, thus, the image can be incorrect for certain perspectives and thus not intuitive for the driver when it is displayed on the display device. If the correct image synthesis for providing these perspectives is not possible, change to another perspective is therefore performed, from which the environmental region can be correctly represented. By the change of the perspective, the partial area of the environmental region displayed in the image in particular varies. In particular, the perspective is automatically or dynamically adapted to the current pivot angle between the trailer and the motor vehicle for example by an evaluation device of the motor vehicle. For example, the pivot angle can be acquired by a sensor device in the tow coupling of the motor vehicle. However, it can also be provided that the perspective change is for example performed in user-initiated manner. As soon as the driver for example notices the incorrect image on the display device, he can initiate the change of the perspective, from which the environmental region is represented on the display device, for example by means of an input device.

Thus, by the perspective change, the driver can be advantageously prevented from being confused by an incorrect image of the environmental region displayed on the display device, and thus the driver and other traffic participants can be prevented from being endangered during maneuvering.

Particularly preferably, a first perspective, from which the environmental region is displayed in the image, is determined if the pivot angle is within a predetermined tolerance range, and a second perspective, from which the environmental region is displayed in the image, is determined if the pivot angle is outside of the predetermined tolerance range. Thus, two perspectives are preset, wherein the first perspective is in particular preset if the pivot angle is about 0 degrees. This means that the environmental region is in particular represented on the display device from the first perspective if the motor vehicle with the trailer travels straight. The second perspective is for example preset if the driver turns a steering wheel of the motor vehicle to turn the motor vehicle and thereby the trailer pivots to the left or to the right. Then, the pivot angle between the trailer and the motor vehicle is a value different from 0 degrees.

In particular, the environmental region adjoining to a rear area of the motor vehicle is displayed from a first person perspective as the first perspective and the environmental region with the motor vehicle and the trailer is displayed from a third person perspective as the second perspective. The first person perspective or ego perspective ("first person view") thereby describes the perspective of a vehicle-side observer in particular internal to vehicle. The third person perspective ("third person view") describes the perspective of an observer external to vehicle. Thus, by the perspective change, the position of the observer changes. Therein, a camera perspective of the vehicle-side rear camera is in particular determined as the first perspective. Therein, a capturing direction of the vehicle-side rear camera is oriented along the vehicle longitudinal axis in rearward direction into the environmental region. By means of the vehicle-side rear camera, thus, the rear environmental region adjoining to the rear area of the motor vehicle can be captured. From the image data of the vehicle-side camera and the trailer-side camera, in particular of the trailer-side and vehicle-side rear cameras, the image can for example be generated by combining or stitching of the image date, which shows the environmental region behind the motor vehicle and the trailer from the first person perspective. This first perspective for example corresponds to a perspective, from which the driver views the environmental region in looking into the interior mirror or in looking through a rear window of the motor vehicle. For providing the third person perspective, therein, an image can be generated from the image data of the vehicle-side and trailer-side cameras, which conveys the impression as if an observer, a so called virtual camera, would be outside the motor vehicle.

Now, if the trailer pivots, thus, a camera perspective of the virtual camera can be determined as the second perspective, which is outside of the motor vehicle and spaced from the motor vehicle such that the environmental region is displayed from the third person perspective. From the image data of the trailer-side camera and the vehicle-side camera, thus, an image is generated, which shows the environmental region of the motor vehicle viewed from the outside. In particular, the image data of further cameras, for example of the all-around view camera system of the motor vehicle and/or the trailer-side lateral cameras, is used for the image synthesis. Alternatively or additionally, 3D-generated rendering of the trailer can be performed in areas, which are located outside of the capturing ranges of the vehicle-side and trailer-side cameras.

Preferably, a model of the trailer and of the motor vehicle is additionally inserted into the image of the environmental region from the second perspective. Herein, the invention is based on the realization that the motor vehicle cannot be captured by the cameras. Therefore, the motor vehicle and in particular also the trailer have to be inserted into the image of the environmental region, for example in the form of a model, which can be recorded in a vehicle-side storage device. In this image of the environmental region from the second perspective, the impression arises for the driver in looking onto the display device as if he would look from the outside, thus from the outside of the motor vehicle, towards the vehicle/trailer combination and thus see the environmental region of the motor vehicle as well as the vehicle/trailer combination itself. By providing the two perspectives, correct and intuitive images of the environmental region can be generated and presented on the display device for the driver even with large pivot angles. Thus, the driver can fast and easily capture the environmental region and safely and reliably maneuver the vehicle/trailer combination.

Therein, a trailer-adjusted image is preferably generated from the image data of the vehicle-side camera and the trailer-side camera by masking the image data associated with the trailer, on which the environmental region behind the motor vehicle and the trailer adjoining to the rear area is represented from the first person perspective. Thus, if the environmental region is displayed from the first person perspective, thus, a "transparent trailer" is implemented. Thereto, an image of the environmental region is in particular generated from the image data of the vehicle-side rear camera and the trailer-side rear data, which shows the environmental region from the view of the rear camera. Therein, the image of the environmental region behind the motor vehicle is in particular created by stitching. The trailer is masked in the image such that the driver of the motor vehicle gets the impression in looking onto the display device as if he could look through the trailer into the rear environmental region.

In particular, in the trailer-adjusted image on the display device, a mark describing a contour of the trailer is additionally displayed. This means that the trailer is indicated in the image, but the view to the rear environmental region is not covered by the trailer. This "transparent trailer" can then be particularly reliably provided if the trailer is not or only little pivoted since the vehicle-side rear camera and the trailer-side rear camera then have approximately the same capturing direction. Namely, the capturing direction of the trailer-side rear camera is also oriented along the longitudinal axis in rearward direction in this case. A camera perspective of the trailer-side camera therefore corresponds to a camera perspective of the vehicle-side camera. However, as soon as the trailer pivots, the capturing direction of the trailer-side camera changes with respect to the capturing direction of the vehicle-side camera. Thereby, the camera perspective of the trailer-side rear camera also changes with respect to the camera perspective of the vehicle-side rear camera. The image then generated by stitching can have a stitching error. In order to prevent this, the third person perspective can be provided in the pivoted state of the trailer.

In order now to generate the third person perspective, a pose of a virtual camera can be determined in the environmental region spaced from the motor vehicle and from the trailer depending on the pivot angle and the image can be determined based on the image data from the perspective of the virtual camera. In other words, this means that an observation point external to vehicle for the virtual camera in the environmental region as well as an orientation of the virtual camera can be automatically determined depending on the current pivot angle. Thus, the camera perspective of the virtual camera is, particularly automatically, adapted to the pivot angle. Therein, it is in particular determined if the trailer pivots in the direction of the driver's side or in the direction of the passenger side. If the trailer for example pivots in the direction of the driver's side, thus, the pose of the virtual camera is determined in the environmental region adjoining to the driver's side such that the virtual camera looks from the environmental region towards the driver's side. If the trailer for example pivots in the direction of the passenger side, thus, the pose of the virtual camera is determined in the environmental region adjoining to the passenger side such that the virtual camera looks from the environmental region towards the passenger side. The direction, in which the trailer pivots, can for example be acquired based on a sign of the pivot angle. By automatically adapting the pose of the virtual camera to the pivot angle of the trailer, the method is therefore particularly simply configured.

Alternatively or additionally, the pose of the virtual camera is determined in the environmental region spaced from the motor vehicle and from the trailer depending on a user input. The driver can thus change the pose of the virtual camera for example via a touch screen or an operating gesture and thus select a desired perspective, from which the environmental region is displayed on the display device from the third person perspective. Thus, the method is particularly user-friendly configured. In addition, in determining the pose of the virtual camera, a speed of the motor vehicle can be taken into account.

In an advantageous development of the invention, one of at least two predetermined reference poses is selected and determined as the pose of the virtual camera. According to this embodiment, the at least two reference poses are preset, which can be automatically selected depending on the pivot angle and/or in user-initiated manner by the driver of the motor vehicle. Thus, in the third person perspective, the pose of the virtual camera can be particularly fast determined. Preferably, a first observation point is preset spaced from a first side of the motor vehicle for a first reference pose, a second observation point is preset spaced from a second side of the motor vehicle for a second reference pose, the virtual camera is placed at one of the observation points and oriented in the direction of the corresponding side of the motor vehicle. Therein, one of the observation points can be automatically and/or user-initiated selected. If the driver for example wants to look in the direction of the driver's side of the motor vehicle and/or it has been detected that the trailer is pivoted in the direction of the driver's side, thus, the driver-side observation point can be selected for the virtual camera. If he wants to look to the passenger side of the motor vehicle and/or it has been detected that the trailer is pivoted in the direction of the passenger side based on the pivot angle, thus, the passenger-side observation point can be selected for the virtual camera.

For at least one third reference pose, a third observation point above the motor vehicle can also be preset and the virtual camera placed at the third observation point can be oriented to a roof of the motor vehicle. Thus, a bird's eye view or a top view can be provided, in which the driver looks from above to the motor vehicle and the trailer in looking to the display device. By providing the different perspectives, the driver can particularly simply and reliably monitor the environmental region around the vehicle/trailer combination by looking to the display device.

In addition, the invention relates to a driver assistance system for assisting a driver of a vehicle/trailer combination having motor vehicle and a trailer in maneuvering the vehicle/trailer combination. According to an embodiment of the driver assistance system, it has at least one vehicle-side camera and at least one trailer-side camera for capturing image data from an environmental region of the motor vehicle. In addition, the driver assistance system can have an evaluation device for creating an image of the environmental region depending on the captured image data as well as a display device for displaying the image. Moreover, the evaluation device is in particular adapted to determine a perspective, from which the environmental region is displayed in the image, depending on a pivot angle between the trailer and the motor vehicle.

Preferably, the driver assistance system includes at least one vehicle-side and at least one trailer-side camera for capturing image data from an environmental region of the motor vehicle. In addition, the driver assistance system has an evaluation device for creating an image of the environmental region depending on the captured image data and a display device for displaying the image. Further, the evaluation device is adapted to determine a perspective, from which the environmental region is displayed in the image, depending on a pivot angle between the trailer and the motor vehicle.

A vehicle/trailer combination with a motor vehicle and a trailer according to the invention includes a driver assistance system according to the invention. The motor vehicle is in particular formed as a passenger car, which has a tow coupling for attaching a trailer.

The preferred embodiments presented with respect to the method according to the invention and the advantages thereof correspondingly apply to the driver assistance system according to the invention as well as to the vehicle/trailer combination according to the invention.

With indications of "behind", "vehicle longitudinal axis", "lateral", "outside", "within", "right", "left", etc., the positions and orientations given with an observer sitting in an interior of a motor vehicle looking along a vehicle longitudinal axis are specified.

Further features of the invention are apparent from the claims, the figures and the description of figures. The features and feature combinations mentioned above in the description as well as the features and feature combinations mentioned below in the description of figures and/or shown in the figures alone are usable not only in the respectively specified combination, but also in other combinations or alone without departing from the scope of the invention. Thus, implementations are also to be considered as encompassed and disclosed by the invention, which are not explicitly shown in the figures and explained, but arise from and can be generated by separated feature combinations from the explained implementations. Implementations and feature combinations are also to be considered as disclosed, which thus do not have all of the features of an originally formulated independent claim. Moreover, implementations and feature combinations are to be considered as disclosed, in particular by the implementations set out above, which extend beyond or deviate from the feature combinations set out in the relations of the claims.

Now, the invention is explained in more detail based on preferred embodiments as well as with reference to the attached drawings.

There show.

In the figures, identical as well as functionally identical elements are provided with the same reference characters.

Figure 1:
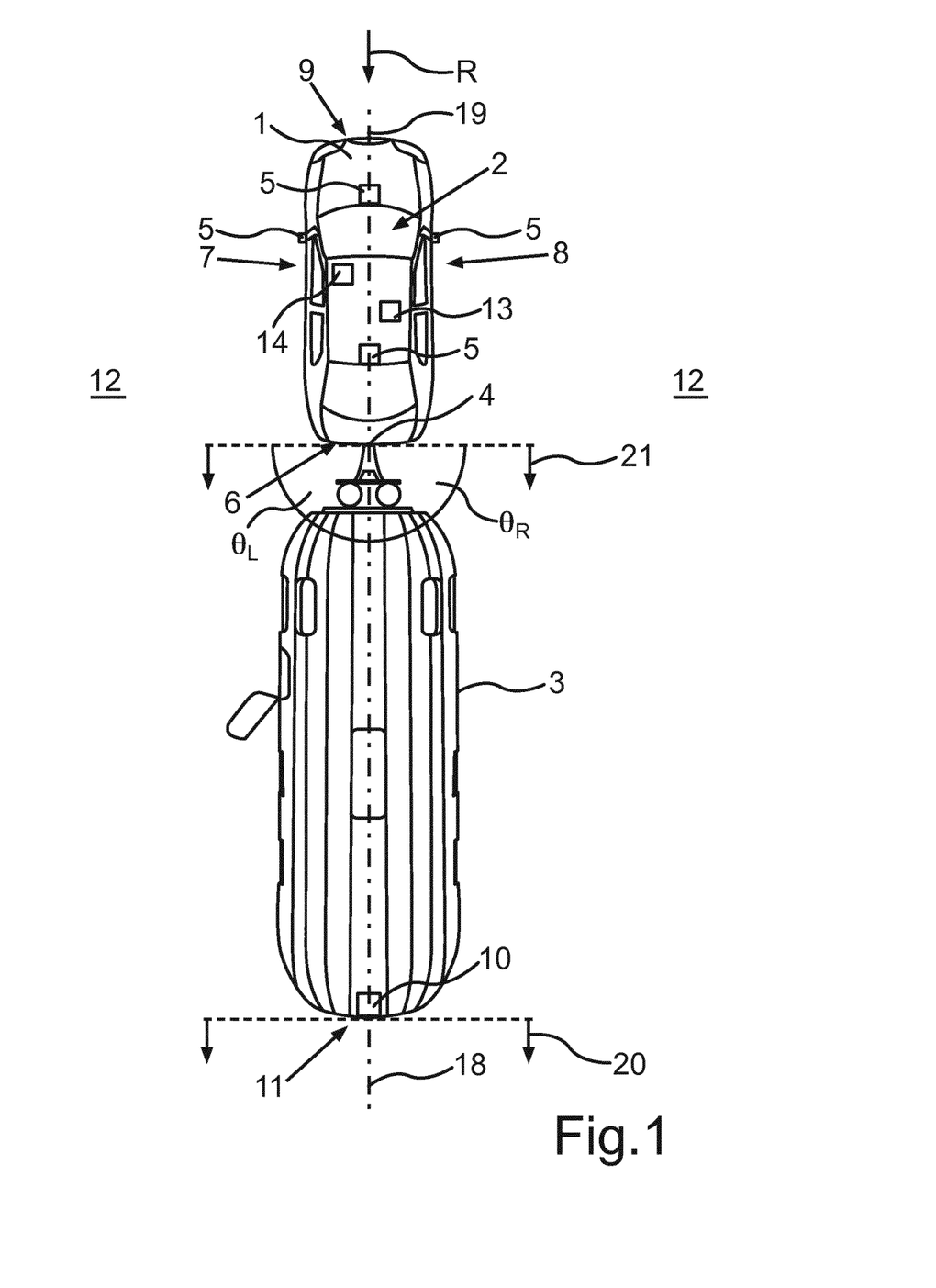
FIG. 1 a schematic representation of an embodiment of a motor vehicle according to the invention with a trailer in a non-pivoted state.
Figure 2:
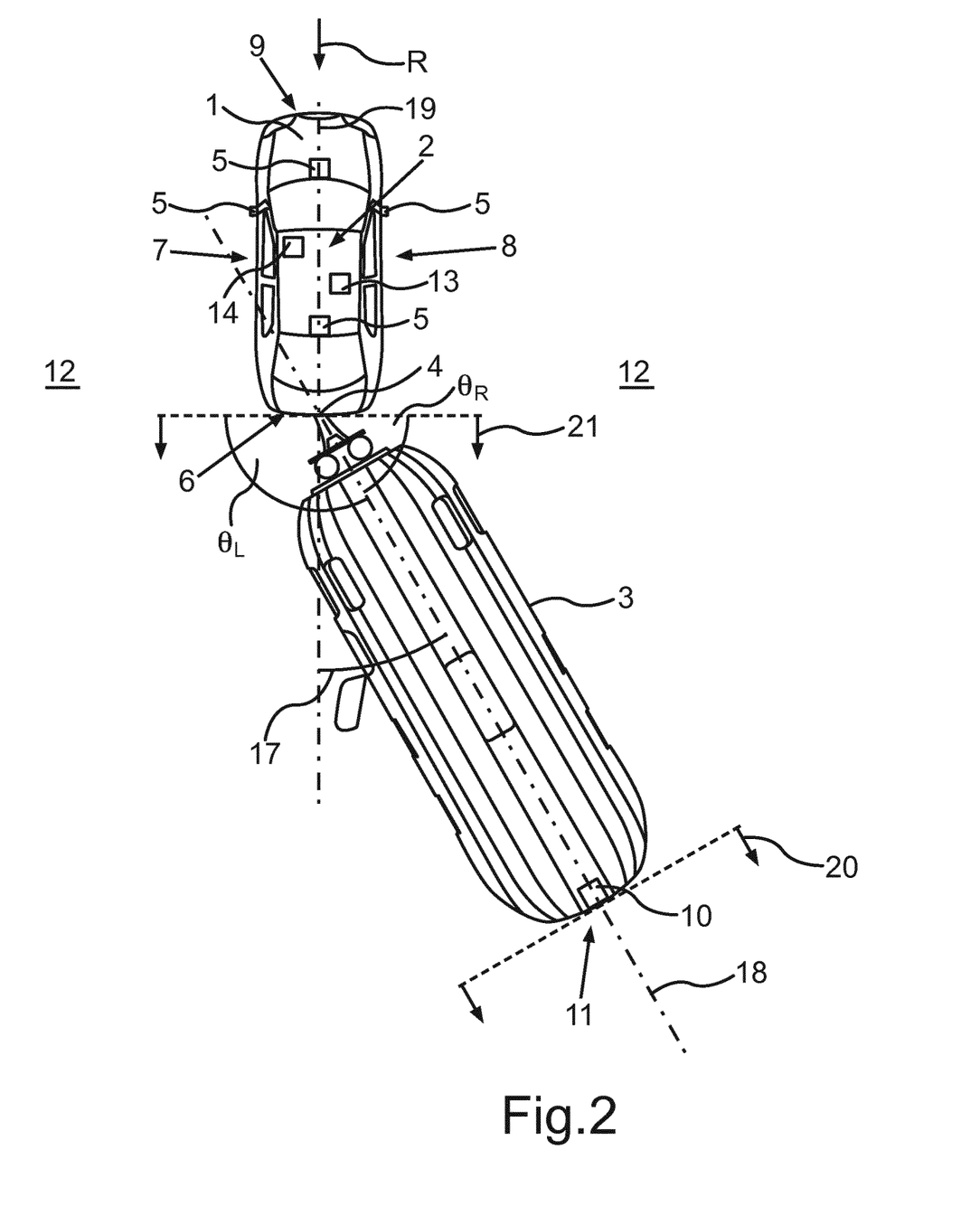
FIG. 2 a schematic representation of the motor vehicle according to FIG. 1 with the trailer in a pivoted state.

FIG. 1 and FIG. 2 show a vehicle/trailer combination with a motor vehicle 1, which is formed as a passenger car in the present case. The motor vehicle 1 has a driver assistance system 2, which assists a driver of the motor vehicle 1 in maneuvering the vehicle/trailer combination with the motor vehicle 1 and with a trailer 3, in particular in reversing along a rearward direction R. For example, the trailer 3 can be a caravan or a horse trailer, which is coupled to the motor vehicle 1 via a tow coupling 4. The driver assistance system 2 has at least one vehicle-side camera 5. In the present case, the motor vehicle 1 has at least four cameras 5, which can form an all-around view camera system. Therein, a first camera 5, a so-called rear camera or reversing camera, is attached to a rear area 6 of the motor vehicle 1. A second camera 5 is attached to a left side 7 of the motor vehicle 1, a third camera 5 is attached to a right side 8 of the motor vehicle 1 and a fourth camera 5 is attached to a front area 9 of the motor vehicle 1. The second and the third camera 5 are so-called wing mirror cameras and can be disposed at a respective wing mirror of the motor vehicle 1 or at the motor vehicle 1 instead of a respective wing mirror. In addition, the trailer 3 has a camera 10, which is disposed in a rear area 11 of the trailer 3. The cameras 5, 10 are adapted to capture image data from an environmental region 12 of the motor vehicle 1.

Figure 7:
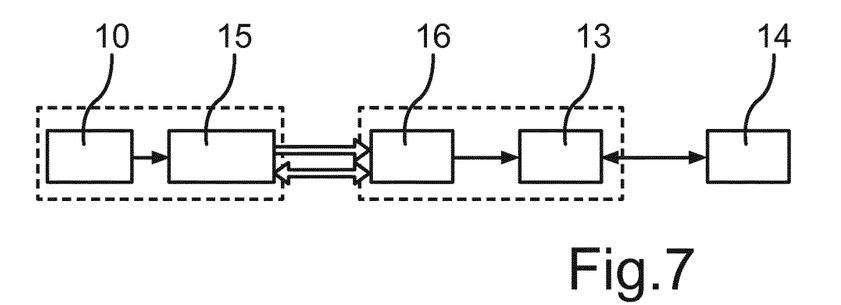
FIG. 7 a schematic representation of an embodiment of a driver assistance system according to the invention.

An evaluation device 13 of the driver assistance system 2, for example a video processor, is adapted to generate an image B of the environmental region 12 from the image data of the cameras 5, 10, which can be displayed on a vehicle-side display device 14. The display device 14 can for example be a screen in an interior of the motor vehicle 1. For transmitting the image data captured by the trailer-side camera 10 to the evaluation device 13, the trailer 3 can for example have a trailer-side transmitting device 15 in the form of a transmitter (see FIG. 7), which can for example wirelessly and bidirectionally communicate with a vehicle-side transmitting device 16 in the form of a receiver. Based on the received trailer-side image data and the vehicle-side image data, the evaluation device 13 can generate the image B of the environmental region 12 and transmit it to the vehicle-side display device 14, for example via LVDS and/or Ethernet.

The trailer 3 is pivotably supported with respect to the motor vehicle 1. In FIG. 1, the trailer 3 is shown in a non-pivoted state. In FIG. 2, the trailer 3 is shown in a pivoted state. In the non-pivoted state, a pivot angle 17 between a longitudinal axis 18 of the trailer 3 and a longitudinal axis 19 of the motor vehicle 1 is about 0 degrees. The longitudinal axis 18 of the trailer 3 is therefore oriented along the longitudinal axis 19 of the motor vehicle 1. A right-side angle OR between the longitudinal axis 18 of the trailer 3 and a vehicle transverse axis and a left-side angle $\Theta_L$ between the longitudinal axis 18 of the trailer 3 and the vehicle transverse axis are about 90 degrees. In the pivoted state, for example during a turning maneuver of the motor vehicle 1, the pivot angle 17 is different from 0 degrees, the longitudinal axis 18 of the trailer 3 is therefore oriented obliquely to the longitudinal axis 19 of the motor vehicle 1. In FIG. 2, the trailer 3 is pivoted to the right such that the right-side angle $\Theta_R$ is less than 90 degrees and the left-side angle $\Theta_L$ is larger than 90 degrees.

For example, the pivot angle 17 can be acquired by a vehicle-side sensor device. Therein, it can additionally be determined based on the sign of the pivot angle 17 if the trailer 3 is pivoted to the left or to the right. Therein, in the non-pivoted state of the trailer 3, a capturing direction 20 of the trailer-side camera 10 is oriented along a capturing direction 21 of the vehicle-side rear camera 5. Here, the capturing directions 20, 21 are oriented along the vehicle longitudinal axis 19 in the rearward direction R. A viewing direction of the trailer-side camera 10 thus corresponds to a viewing direction of the vehicle-side rear camera 5. In the pivoted state of the trailer 3, the capturing direction 20 of the trailer-side camera 10 is oriented obliquely to the capturing direction 21 of the vehicle-side rear camera 5. The viewing directions of the cameras 5, 10 are therefore oriented in different directions.

Figure 3:
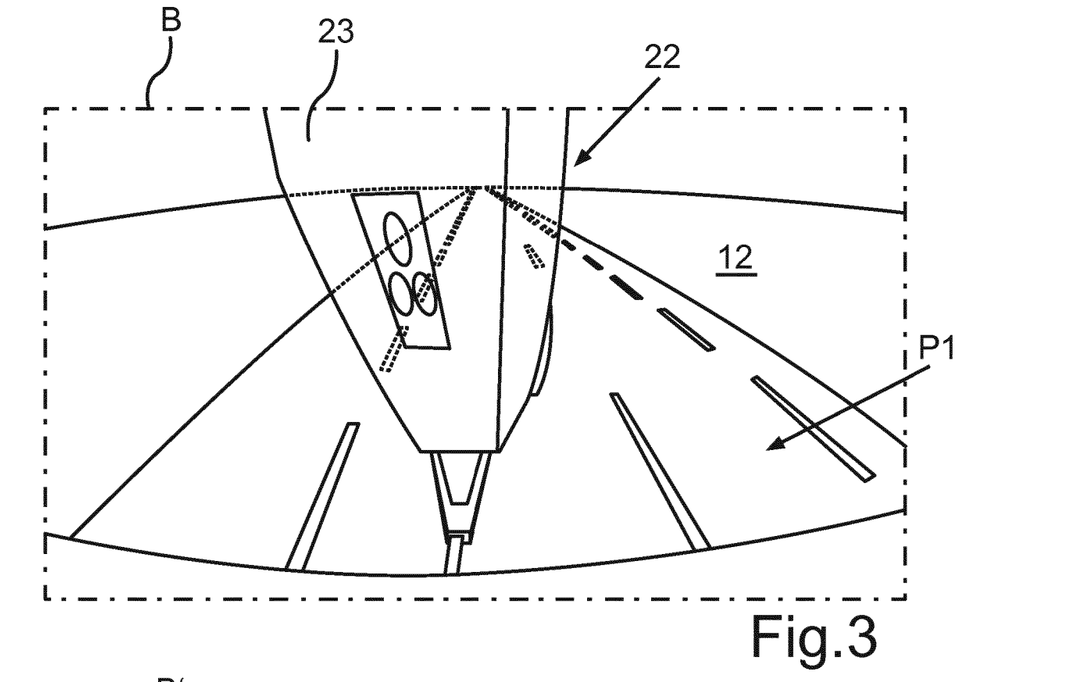
FIG. 3 a schematic representation of an image of an environmental region of the motor vehicle displayed on a vehicle-side display device, FIG. 4 a further schematic representation of an image of the environmental region of the motor vehicle.

In FIG. 3, now, an image B of the environmental region 12 is shown, which has been generated from the image data of the vehicle-side rear camera 5 and the trailer-side rear camera 10, for example by means of combining or stitching of the image data. The image B shows the environmental region 12 from a first perspective P1, here from a first person perspective. Here, the first perspective P1 corresponds to a camera perspective of the vehicle-side rear camera 5 and shows the environmental region 12 behind the motor vehicle 1 and the trailer 3. Therein, a so-called "transparent trailer" 22 is shown in the image B. This means that a contour 23 of the trailer 3 is displayed in the image B, which gives information to the driver about where the trailer 3 is located in the environmental region 12. However, the trailer 22 represented in the image B does not cover the environmental region 12 behind the real trailer 3. Rather, the driver gets the impression as if he could see through the trailer 3 and perceive the environmental region 12 behind the trailer 3.

Figure 4:
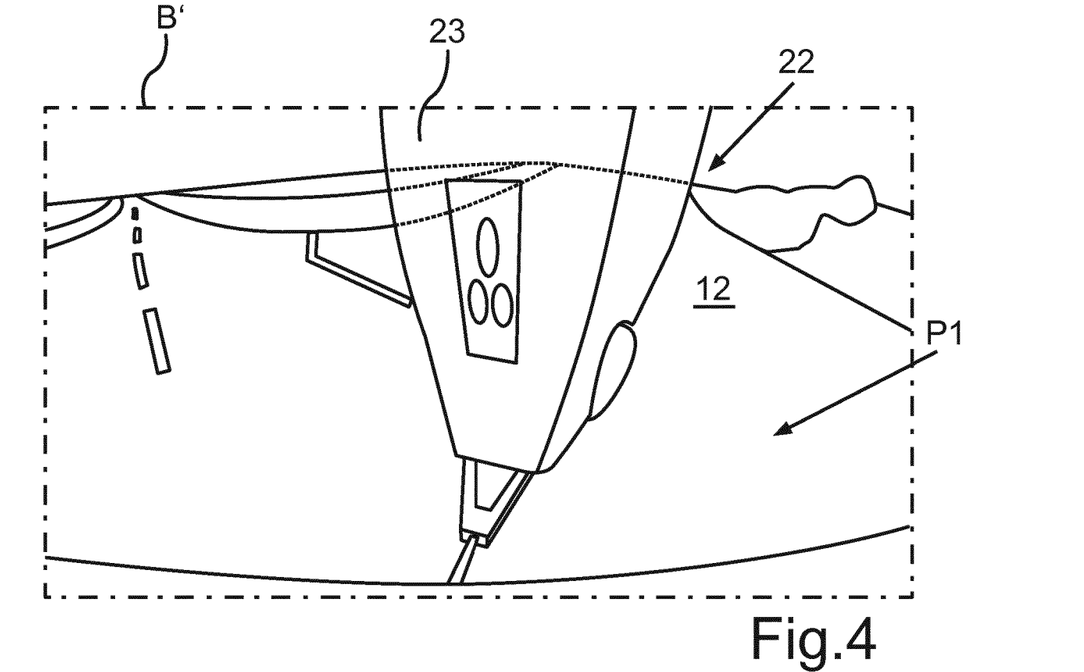

In FIG. 4, now, an incorrect image 13 is shown, which has also been generated from the image data of the trailer-side camera 10 and the vehicle-side camera 5, while the trailer 3 has been in the pivoted state. By pivoting the trailer 3, the capturing direction 20 of the trailer-side camera 10 has shifted with respect to the capturing direction 21 of the vehicle-side camera 5 such that the image data of the cameras 10, 5 have not been correctly combined. The image B' is incorrect, wherein the environmental region 12 represented in the image B' from the first perspective P1 is non-intuitive for the driver.

Figure 5:
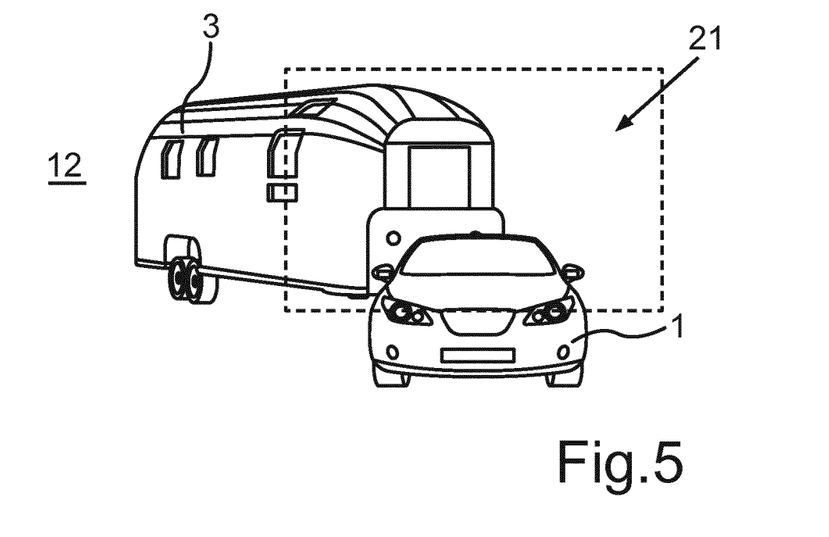
FIG. 5 a schematic representation of the motor vehicle and of the trailer according to FIG. 2 in a perspective view.
Figure 6:
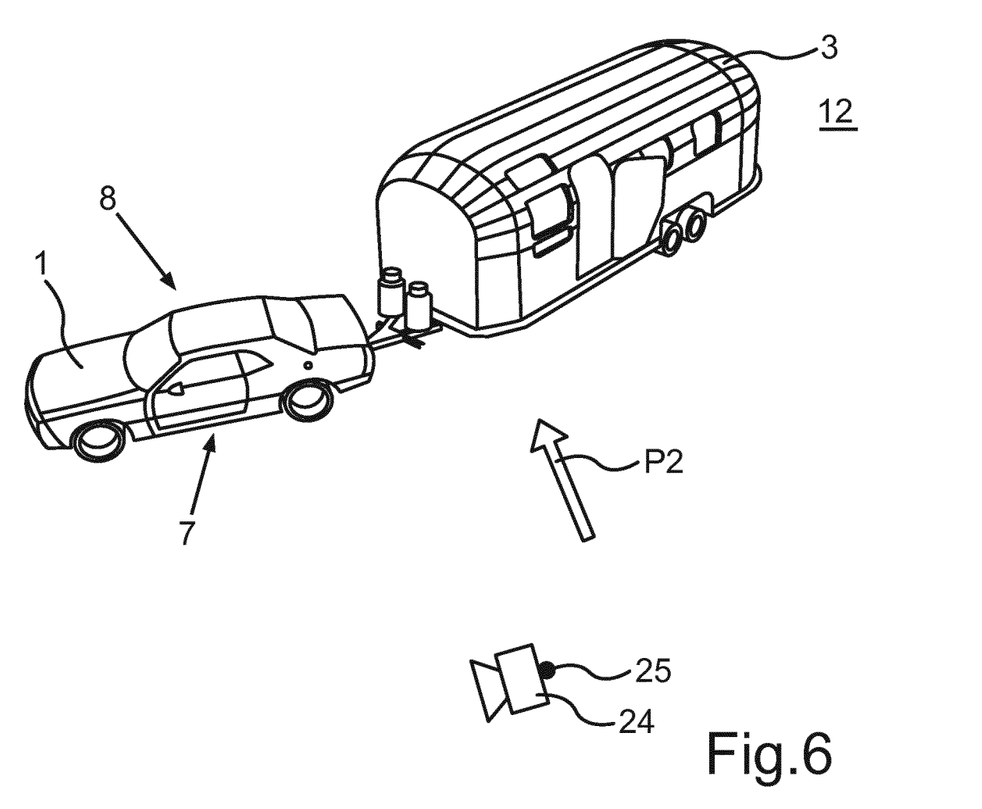
FIG. 6 a schematic representation of the motor vehicle and of the trailer according to FIG. 2 in a further perspective view.

In order to prevent this non-intuitive representation of the environmental region 12 on the display device 14, the perspective, from which the environmental region 12 is represented in the image B, is changed in the pivoted state of the trailer 3. Therein, the environmental region 12 is not represented from the first perspective P1, thus the camera perspective of the vehicle-side rear camera 5 having the capturing direction 21 oriented rearwards along the vehicle longitudinal axis 19 (see FIG. 5), but from a second perspective P2, in particular a third person perspective, in the pivoted state. For generating the third person perspective, a pose 25 of a virtual camera 24 (see FIG. 6) is determined in the environmental region 12 and the image B is created from the image data of the trailer-side camera 10 and the vehicle-side cameras 5 such that the environmental region 12 is represented from the camera perspective of the virtual camera 24. Therein, the pose 25 of the virtual camera 24 can be automatically adapted to the current pivot angle 17 and/or be preset by the driver of the motor vehicle 1 by means of an input device. Therein, various reference poses 25 can be preset in the environmental region 12 and be recorded in a vehicle-side storage device, which can be automatically selected depending on the pivot angle 17 and/or by the driver. The image B, which shows the environmental region 12 from the second perspective P2, also shows the motor vehicle 1 and the trailer 3 in the form of a model of the motor vehicle 1 and the trailer 3 inserted into the image.

Figure 8:
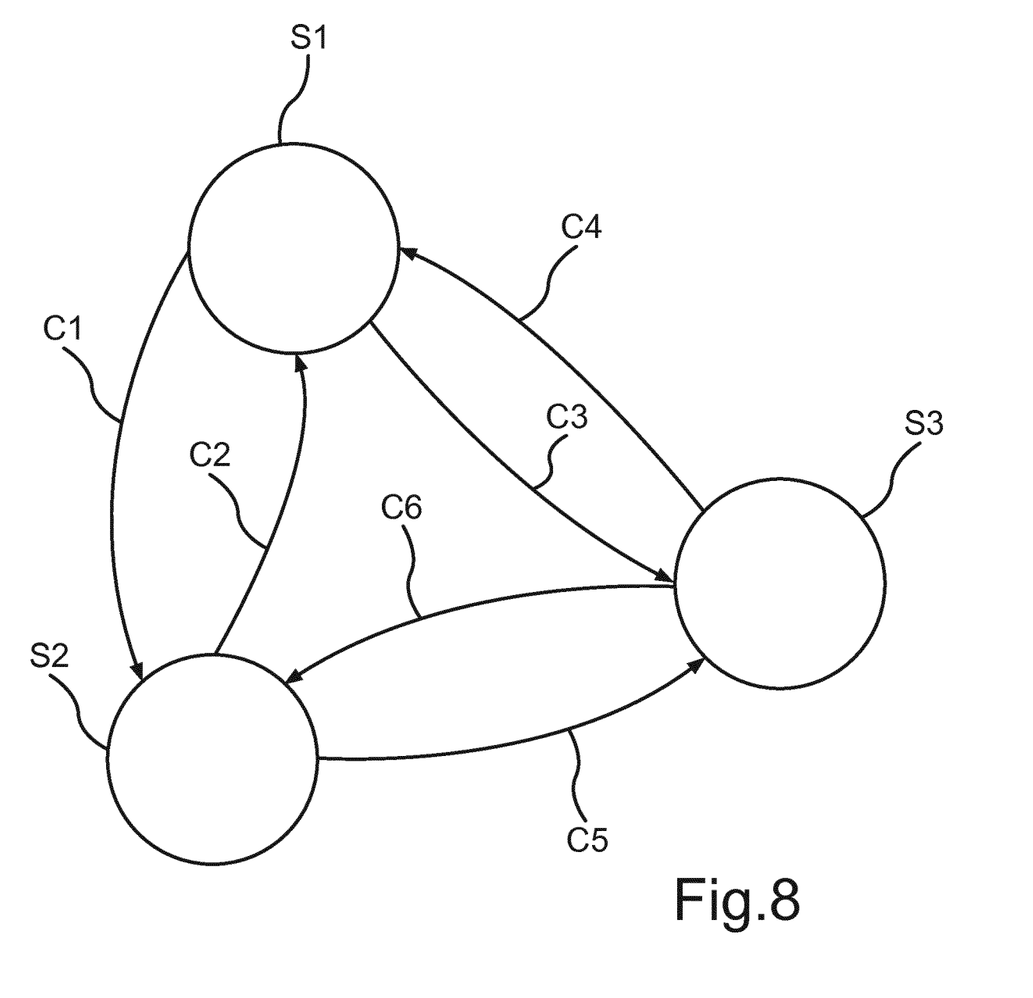
FIG. 8 a schematic representation of a state machine.

In FIG. 8, a state machine is shown, which visualizes the change between the first and the second perspective P1, P2. Therein, it is differentiated here between three states S1, S2, S3, which describe the perspectives P1, P2, from which the environmental region 12 is represented in the image B. In a first state S1, the image B is presented from the first perspective P1. In a second state S2, the image is presented from the second perspective P2, wherein the pose 25 of the virtual camera 24 is determined in the environmental region 12 adjoining to the left side 7 of the motor vehicle 1. In the second state S2, the virtual camera 24 is therefore placed on the left side in the environmental region 12. In the third state S3, the image B is also represented from the second perspective P2, wherein the pose 25 of the virtual camera 24 is determined in the environmental region 12 adjoining to the right side 8 of the motor vehicle 1. In the third state S3, the virtual camera 24 is therefore placed on the right side in the environmental region 12. If a first condition C1 is satisfied, it is changed between the first state S1 and the second state S2. Here, the first condition C1 is satisfied if the trailer 3 is pivoted to the left and the pivot angle 17 therein exceeds a predetermined left-side threshold value. If a second condition C2 is satisfied, it is again changed from the second state S2 to the first state S1. Here, the second condition C2 is satisfied if the pivot angle 17 of the trailer 3 pivoted to the left again falls below the left-side threshold value, in particular with a hysteresis.

If a third condition C3 is satisfied, it is changed between the first state S1 and the third state S3. Here, the third condition C3 is satisfied if the trailer 3 is pivoted to the right and the pivot angle 17 therein exceeds a predetermined right-side threshold value. If a fourth condition C4 is satisfied, it is again changed from the third state S3 to the first state S1. Here, the fourth condition C4 is satisfied if the pivot angle 17 of the trailer 3 pivoted to the right again falls below the right-side threshold value 17, in particular with a hysteresis.

The change between the second state S2 and the third state S3 can for example be effected in user-initiated manner. If a fifth condition C5 is satisfied, it is changed from the left-side placed virtual camera 24 to the right-side placed virtual camera 24. The fifth condition C5 is for example satisfied if the driver has selected it for example by pressing an operating element and/or by means of a gesture. If a sixth condition C6 is satisfied, it is changed from the right-side placed virtual camera 24 to the left-side placed virtual camera 24. The sixth condition C6 is for example satisfied if the driver has selected it for example by pressing an operating element and/or by means of a gesture. The change between the second and the third state S2, S3 can also be automatically performed depending on the pivot angle 17.

The invention claimed is:

1. A method for assisting a driver of a motor vehicle in maneuvering the motor vehicle with a trailer, the method comprising:
    capturing image data from an environmental region of the motor vehicle by at least one vehicle-side camera and at least one trailer-side camera;
    generating, based on the captured image data from the at least one vehicle-side camera and the at least one trailer-side camera, an image of the environmental region for displaying on a vehicle-side display device depending on a pivot angle between the trailer and the motor vehicle;
    determining a perspective from which the environmental region is displayed in the image, comprising;
        determining a first perspective from which the environmental region is displayed in the image when the pivot angle is within a predetermined tolerance range, and
        determining a second perspective from which the environmental region is displayed in the image when the pivot angle is outside of the predetermined tolerance range; and
    automatically switching, in response to detecting the pivot angle changing between within the predetermined tolerance range and outside of the predetermined tolerance range, the perspective between the first perspective and the second perspective,
    wherein the environmental region adjoining to a rear area of the motor vehicle is displayed from a first person perspective as the first perspective, and the environmental region encompassing the motor vehicle and the trailer is displayed from a third person perspective as the second perspective.

2. The method according to claim 1, wherein a trailer-adjusted image is generated from the image data of the vehicle-side camera and the trailer-side camera by masking the image data associated with the trailer, on which the environmental region adjoining to the rear area of the motor vehicle behind the motor vehicle and the trailer is represented from the first person perspective.

3. The method according to claim 2, wherein mark describing a contour of the trailer is additionally displayed in the trailer-adjusted image on the display device.

4. The method according to claim 1, wherein the third person perspective of the environmental region is generated from the image data of the vehicle-side camera and the trailer-side camera, into which a model of the motor vehicle and of the trailer is inserted.

5. The method according to claim 1, wherein for providing the third person perspective, a pose of a virtual camera is determined in the environmental region spaced from the motor vehicle and from the trailer depending on the pivot angle and the image is determined based on the image data from the perspective of the virtual camera.

6. The method according to claim 1, wherein for providing the third person perspective, a pose of a virtual camera is determined in the environmental region spaced from the motor vehicle and from the trailer depending on a user input and the image is determined based on the image data from the perspective of the virtual camera.

7. The method according to claim 5, wherein the pose of the virtual camera is determined depending on a speed of the motor vehicle.

8. The method according to claim 5, wherein one of at least two predetermined reference poses is selected depending on a user input and/or depending on the pivot angle and the selected, predetermined reference pose is determined as the pose of the virtual camera.

9. The method according to claim 8, wherein for a first reference pose, a first observation point is preset spaced from a first side of the motor vehicle, for a second reference pose, a second observation point is preset spaced from a second side of the motor vehicle, the virtual camera is placed at one of the observation points and is oriented in the direction of the corresponding side of the motor vehicle.

10. The method according to claim 9, wherein for at least one third reference pose, a third observation point is preset above the motor vehicle and the virtual camera placed at the third observation point is oriented to a roof of the motor vehicle.

11. The method according to claim 1, wherein the image data is captured by a rear camera of the trailer as the at least one trailer-side camera and by a rear camera of the motor vehicle as the at least one vehicle-side camera.

12. A driver assistance system for a vehicle/trailer combination with a motor vehicle and a trailer for assisting a driver of the vehicle/trailer combination in maneuvering the vehicle/trailer combination, the driver assistance system comprising:

at least one vehicle-side camera and at least one trailer-side camera for capturing image data from an environmental region of the motor vehicle; and an evaluation device for creating an image of the environmental region depending on the captured image data from the at least one vehicle-side camera and the at least one trailer-side camera; and a display device for displaying the image depending on a pivot angle between the trailer and the motor vehicle, wherein the evaluation device determines a perspective from which the environmental region is displayed in the image, wherein determining the perspective comprises:
  determining a first perspective from which the environmental region is displayed in the image when the pivot angle is within a predetermined tolerance range, and
  determining a second perspective from which the environmental region is displayed in the image when the pivot angle is outside of the predetermined tolerance range, wherein the evaluation device automatically switches, in response to detecting the pivot angle changing between within the predetermined tolerance range and outside of the predetermined tolerance range, the perspective between the first perspective and the second perspective, and wherein the environmental region adjoining to a rear area of the motor vehicle is displayed from a first person perspective as the first perspective, and the environmental region encompassing the motor vehicle and the trailer is displayed from a third person perspective as the second perspective.

13. A vehicle/trailer combination with a motor vehicle; a trailer; and a driver assistance system according to claim 12.

* * * * *